United States Patent [19]

Grant

[11] 4,148,708
[45] Apr. 10, 1979

[54] COMBINATION ION EXCHANGE AND ELECTRODIALYSIS FLUID PURIFICATION APPARATUS

[75] Inventor: Philip J. Grant, Lynchburg, Va.

[73] Assignee: The Babcock & Wilcox Company, New York, N.Y.

[21] Appl. No.: 817,952

[22] Filed: Jul. 22, 1977

[51] Int. Cl.² .................................... B01D 13/02
[52] U.S. Cl. ........................... 204/301; 204/180 P
[58] Field of Search ............ 204/180 B, 180 P, 301, 204/128, 129

[56] References Cited

U.S. PATENT DOCUMENTS

| 3,046,211 | 7/1962 | Tye .................................. 204/301 X |
| 3,686,089 | 8/1972 | Korngold et al. ............... 204/301 X |
| 3,869,376 | 3/1975 | Tejeda ................................. 204/301 |

OTHER PUBLICATIONS

Helfferich, "Ion Exchange", McGraw-Hill Book Co., (1962), pp. 10 & 11.

*Primary Examiner*—Arthur C. Prescott
*Attorney, Agent, or Firm*—J. M. Maguire; J. P. Sinnott

[57] ABSTRACT

An illustrative embodiment of the invention converts a feed solution stream into three separate streams of concentrated acid, concentrated alkali and deionized liquid, respectively, through a combination of ion exchange and electrodialysis techniques. Typically, feed fluid from the primary coolant loop of a nuclear reactor that contains ionized boric acid and lithium −7 hydroxide flows into a bed of mixed anion and cation exchange resins. Two of the walls of this bed, however, are of anion permeable and cation permeable membranes respectively, to permit the anions to migrate into an anolyte compartment and to permit the cations to migrate into a catholyte compartment. Within the anolyte compartment there is an anion resin bed which purifies the borate ions from other contaminative anions. Within the catholyte compartment there is a cation resin bed which purifies the lithium ions from other contaminative cations. Appropriately selected anion permeable and cation permeable membranes for the other sides of the catholyte and anolyte compartments, respectively, allow sufficient ion migration to permit a degree of chemcal recombination. The final products from these three flow paths are concentrated boric acid, concentrated lithium hydroxide and deionized water from the respective analyte, catholyte and feed fluid compartments.

9 Claims, 2 Drawing Figures

COMBINATION ION EXCHANGE AND ELECTRODIALYSIS FLUID PURIFICATION APPARATUS

BACKGROUND OF THE INVENTION

1. Field of the Invention

This invention relates to fluid purification techniques and, more particularly, to a combination of ion exchange and electrodialysis apparatuses to process water from the primary coolant loop of a nuclear power plant, and any other cation and anion laden stream which requires purification and concentration.

DESCRIPTION OF THE PRIOR ART

To control the power generated in a nuclear reactor it is customary to dissolve neutron-absorbing boron in the cooling water that flows through the reactor core. The nuclei of the boron atoms absorb some of the neutrons that are generated in the fission processes within the reactor core, thereby regulating the power that the core will produce through a controlled reduction of the neutron population within the core. As an incident of this neutron absorbing process, moreover, those boron nuclei that have absorbed neutrons generally decay into lithium nuclei or isotopes of lithium, each with a resulting atomic mass number of seven 7 (lithium 7).

To control reactor core corrosion, it also is customary to add lithium hydroxide to the water in the primary reactor core coolant loop. The lithium isotope selected for this use is that isotope with the mass number 7, because contrary to the boron function mentioned above, this specific lithium isotope generally will absorb less neutrons and produce less hazardous quantities of tritium. Further in this respect there is a shortage of this particular lithium isotope in a form that is highly enriched relative to the other isotopes of lithium.

To vary the boron concentration in the primary coolant in order to adjust the reactor power output and to control the lithium hydroxide concentration in the core coolant, it has been the practice to use a number of rather elaborate techniques. Typically, these processes have used evaporators, crystallizers, precipitation/scavenge units and the like. Performance of these systems has been unsatisfactory and, on frequent occasions, power plant operations have been restricted and extensive modifications have been undertaken. The expense and loss of equipment utilization incurred because of the inadequacies of these systems is a definite burden and there clearly is a need for major improvement.

As a further consequence of neutron exposure within the reactor core, tritium, a heavy isotope of hydrogen, often is produced. There are health and environmental hazards associated with this substance, and in existing nuclear power plants considerable effort is expended to remove this "tritiated water" from the plant site.

There has been some research directed to the application of ion exchange and electrodialysis technologies to radioactive waste water treatment. Briefly, this research incorporated a standard electrodialysis cell arrangement in which salts are collected and concentrated in specified compartments and fresh product water is produced via ion transport through perm selective membranes. For the purpose of electrodialysis, it has been found that certain materials or membranes are selectively permeable to cations and other membranes permeable to anions. In the circumstances if a cation membrane is interposed between ion-rich water and a negatively charged cathode, the positively charged cations will migrate through the membrane to the cathode. The membrane, however, will effectively block transport of negatively charged anions through the membrane toward the cathode. In much the same manner an anion membrane will permit negatively charged anions to migrate toward a positively charged anode, while at the same time presenting a barrier to cation travel in that same direction. Mixed bed ion exchange resins are used in the product water streams to facilitate ion removal and transport. The concentrated waste streams are collected and solidified for waste disposal. This arrangement consists of alternating concentrate and product water compartments sandwiched between a pair of electrodes.

With respect to the chemistry and chemical phenomena which occur, the following is pertinent. Briefly, many acids and many bases disassociate in water into component ions. Thus, boric acid in a water solution breaks up into a negatively charged borate ion and into a positively charged hydrogen ion. All negatively charged ions are call "anions" and all positively charged ions are called "cations."

It has been found, moreover, that some types of resins have an affinity for anions and other resins have an affinity for cations. Use has been made of this knowledge to remove ionized matter from water. Thus, the ion-rich water is passed through a mixed bed of anion and cation resins, the anion resin removing the anions from the water and the cation resins removing the cations from the water.

Electrodialysis, on the other hand, is an entirely different process. Usually, a pair of electrodes are immersed in ion-rich water and these electrodes are given opposite electrical charges, the negatively charged anions tend to migrate toward the positively charged anode. Conversely, the positively charged cations tend to migrate toward the negatively charged cathode.

SUMMARY OF THE INVENTION

Illustratively, a cation resin bed is placed between the cation membrane and the negatively charged cathode and an anion resin bed is placed between the anion membrane and the positively charged anode. To complete this illustrative structure, two further membranes are added to the combination. A cation membrane, for example, is interposed between the anion resin bed and the positively charged anode. Conversely, an anion membrane is placed between the cation resin bed and the negatively charged cathode. This structural feature of the invention provides not only a continuous stream of very pure deionized water from the mixed resin bed, but also generates continuous streams of concentrated acid from the anolyte compartment that houses the anion resin bed and concentrated alkali from the catholyte compartment that houses the cation resin bed.

This continuous production of acid and base is, of course, in sharp contrast to earlier efforts to combine ion exchange and electrodialysis methods which combined anions and cations to produce a concentrated salt stream of water.

More specifically, a typical embodiment of the invention applied to the problems of reactor core cooling water purification not only produces pure water as well as concentrated boric acid and lithium hydroxide but also has the highly beneficial effect of salvaging the lithium$^{-7}$ that is produced through the disintegration of the boron$^{-10}$ nucleus following a neutron absorption and recovering this rare isotope which is introduced as a rare material. Through the addition of a suitable material to this cellular structure, moreover, tritium can be preferentially extracted from the water by the material for subsequent disposal in a concentrated form.

Thus, there is provided in accordance with the principles of the invention a technique that continuously processes an ion-rich input feed fluid into a deionized liquid, a concentrated acid and a concentrated alkali. Used in conjunction with nuclear reactor core coolant water, the system characterizing this invention produces the further benefits of lithium$^{-7}$ recovery and tritium removal.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
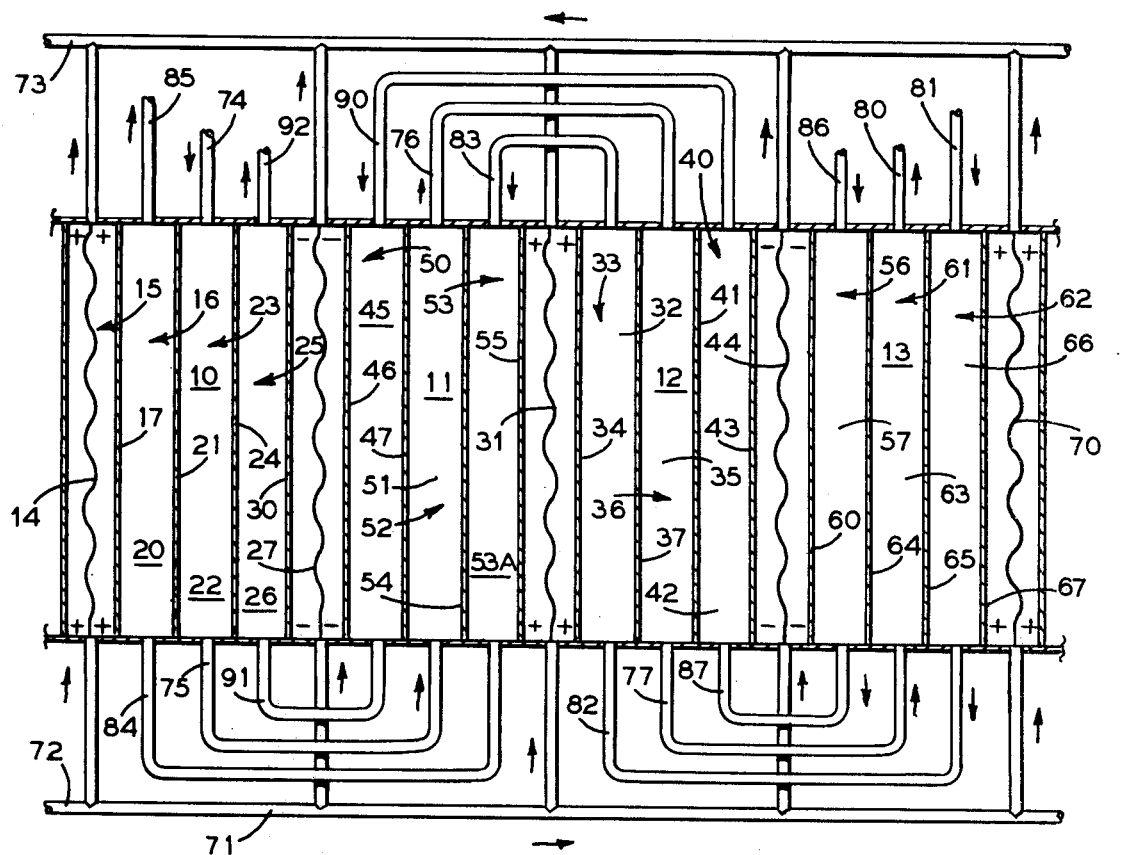
FIG. 1 is a schematic diagram of a system that illustrates principles of the invention.

For a more complete appreciation of the invention, attention is invited to FIG. 1 which shows an array of four cells 10, 11, 12 and 13. The cells 10 and 12 are identical in major features and the cells 11 and 13 are similar to each other although they are different in the relative arrangement of their structural components from the cells 10 and 12, as hereinafter described.

The cell 10 has an anode 14 in an anode compartment 15. As illustrated, the anode 14 is electrically coupled to an appropriate power supply (not shown) to produce a positive charge on the electrode surface.

The anode compartment 15 is segregated from an anolyte compartment 16 by means of a cation membrane 17. As mentioned above, cation membranes permit positively charged cations to migrate from one side of the membrane to the other. A cation membrane, however, will not permit a negatively charged anion to migrate from one membrane side through to the opposite side of that membrane. Illustratively, some typical cation membranes are enumerated on pages 17–53 of *Chemical Engineers' Handbook*, Fifth Edition, Perry, et al., McGraw-Hill Book Company, New York, 1973. It has been found moreover, that an Ionics, Inc. cation membrane 61-CZL-183 is suitable for the purpose of the invention.

The anolyte compartment 16 contains an anion resin bed 20 that is packed into a generally rectangular prism volume in which one of the sides of the prism is formed by the cation membrane 17. The anion resin bed 20 generally is a mass of packed, spherical beads of a resinous material that preferentially absorbs contaminative anions and releases more preferred anions. Typically Rohn & Haas "Amberlite" anion resin IRN-78 is adequate for use in the invention. An anion membrane 21 that is spaced from and parallel with the membrane 17 forms another of the sides of the anolyte compartment 16. Resin beds that absorb only anionic matter or only cationic matter often are referred to as mono-ion exchange resin beds. As might be expected, anion membranes permit negatively charged ions to migrate from one side of the membrane to the other. Anion membranes, however, will not permit a positively charged cation to migrate from one membrane side through to the opposite side of that membrane. A number of anion membranes also are listed on page 17–53 of *Chemical Engineers' Handbook*, and Ionics, Inc. Anion Membrane 103-PZL-065 can be used in the system under consideration.

A mixed resin bed 22 fills the volume of a rectangular prism-shaped feed inlet compartment 23. The resins in the mixed bed 22 are of a type most suitable for the fluid that is being processed. In any event, the mixed resin bed 22 has an affinity for cations and anions, removing both of the materials from solution. As shown in FIG. 1, the mixed resin bed 22 is sandwiched between the anion membrane 21 and a cation membrane 24. "Amberlite" Mixed Bed Resin IRN-150, sold by Rohm & Haas can be used for the described purposes.

It is the cation membrane 24, moreover, that forms the partition dividing the feed inlet compartment 23 from a catholyte compartment 25. Within the catholyte compartment 25, a rectangular prism-shaped cation resin bed 26 of packed resin beads, or the like, exchanges contaminative cations for preferred cations in the compartment 25. Rohm & Haas "Amberlite" cation resin IRN-77 is a typical resin that produces acceptable results.

A negatively charged cathode 27, electrically coupled to a suitable power supply (not shown) is separated from the catholyte compartment 25 by means of an anion membrane 30 and is spaced from the cation membrane 24 by means of the cation resin bed 26. In this manner, the membrane 30 forms a partition for the catholyte compartment 25 that is parallel to the cation membrane 24.

It will be recalled that the cell 12 is identical in construction to the cell 10. Accordingly, the cell 12 has a positively charged anode 31 that is spaced from a anion resin bed 32 in an anolyte compartment 33 by means of a cation membrane 34. The anolyte compartment 33, moreover, is separated from a mixed resin bed 35 in a feed compartment 36 through an anion membrane 37.

Catholyte compartment 40 is partitioned from the feed compartment 36 by means of a cation membrane 41, thereby sandwiching a cation resin bed 42 between the cation membrane 41 and an anion membrane 43. The membrane 43 also is positioned between the cation resin bed 42 and a negatively charged cathode 44.

Cell 11, however, has a somewhat different relative arrangement of structural components. Thus, the negatively charged cathode 27 is separated from a cation resin bed 45 through an anion membrane 46. A cation membrane 47 establishes a further partition between the cation resin bed 45 in a catholyte compartment 50 and mixed resin bed 51 in a feed compartment 52. An anolyte compartment 53 is formed adjacent to the feed compartment 52 by means of an anion membrane 54 which acts as a partition between the feed compartment 52 and the anolyte compartment 53 thereby sandwiching anion resin bed 53A. The positively charged anode 31, moreover, is separated from the anolyte compartment 53 by means of cation membrane 55.

Cell 13 is arranged in a manner that is similar to the cell 11. Illustratively, the cell 13 has a catholyte compartment 56 that contains a cation resin bed 57 separated from the negatively charged cathode 44 by means of an anion membrane 60. Feed compartment 61 is established between the catholyte compartment 56 and an anolyte compartment 62. The feed compartment 61 houses a mixed resin bed 63 that is segregated from the catholyte compartment 56 by means of a cation membrane 64 and segregated from the anolyte compartment 62 through an anion membrane 65. Further in this respect, in the anolyte compartment 62 an anion resin bed 66 is sandwiched between the anion membrane 65 and a cation membrane 67. It is the cation membrane 67 that segregates the anion resin bed 66 from a positively charged anode 70.

Normally the electrode compartments are purged by use of a dilute electrolyte such as nitric acid. However, feasibility has been shown on this apparatus by incorporating a mixed bed resin in each of the electrode compartments and purging with the cell effluent deionized water stream. An electrode rinse conduit 71 establishes fluid communication between a rinse inlet 72, the anodes 14, 31, 70 and the cathodes 27, 44, and a rinse discharge 73 in order to flush contaminants, gases and the like from the anode and cathode structures and thereby assist in maintaining system efficiency.

Feed fluid is admitted to the structure through a feed fluid inlet 74 in order to flow in the direction indicated by means of an arrow adjacent to the inlet 74 through a path that includes the feed inlet compartment 23, a conduit 75, the feed compartment 52, a conduit 76, the feed compartment 36, a conduit 77, the feed compartment 61 and a feed fluid discharge conduit 80.

Anolyte fluid, in the illustrative example of the invention that is shown in FIG. 1 enters the system by way of an anolyte inlet conduit 81 and flows in the direction of the arrow adjacent to the conduit 81 through the anolyte compartment 62, a conduit 82, the anolyte compartment 33, a conduit 83, the anolyte compartment 53, a conduit 84, the anolyte compartment 16 and out of the system through an anolyte discharge conduit 85.

The flow path for the catholyte commences at a catholyte inlet conduit 86 and continues in the direction of the arrow adjacent to the conduit 86 through the catholyte compartment 56, a conduit 87, the catholyte compartment 40, a conduit 90, the catholyte compartment 50, a conduit 91, the catholyte compartment 25 and out of the system by way of a catholyte discharge conduit 92.

The series flow arrangement with multiple cell configuration can be designed depending on the degree of chemical concentrating factors desired in the respective anolyte and catholyte streams. Likewise the degree of effluent purity desired from the mixed bed compartment will determine the number of series compartment arrangements needed. Conversely, a parallel flow arrangement can be designed according to the flow capacity requirements of the process.

Figure 2:
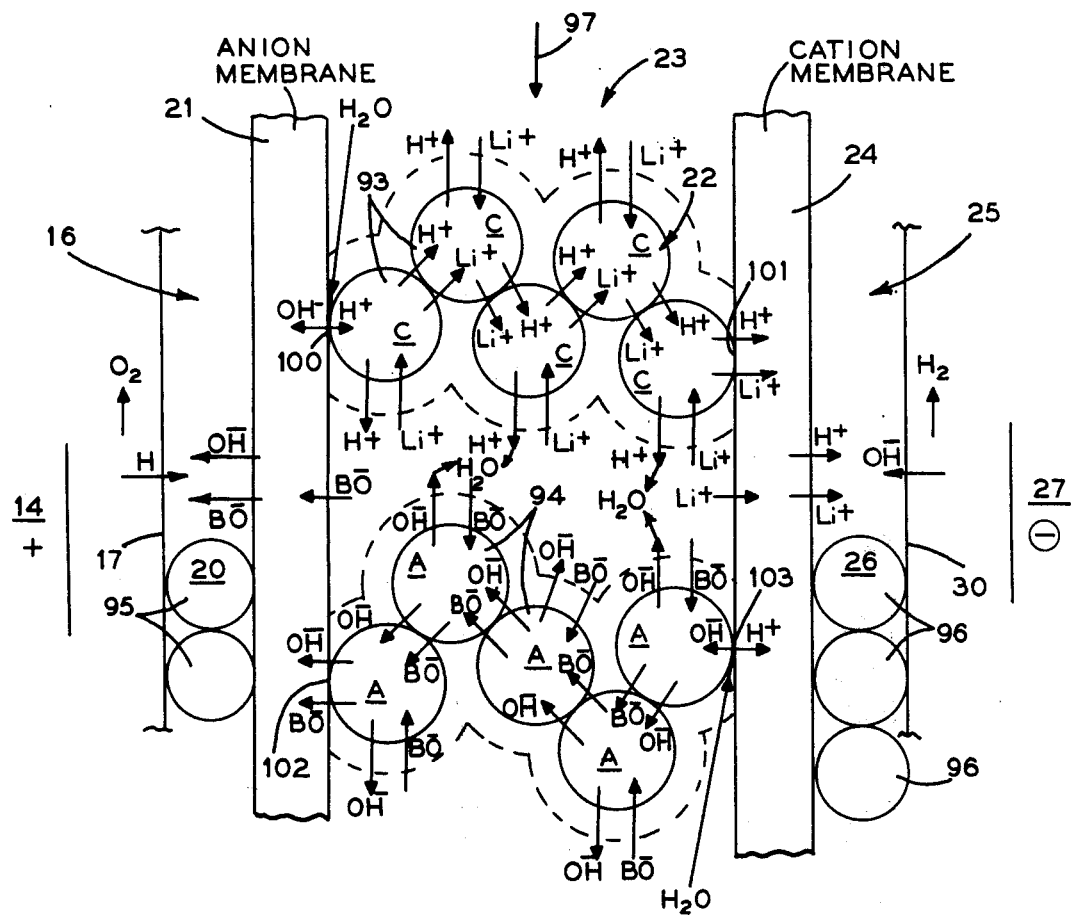
FIG. 2 is a diagram that illustrates phenomena that is believed to characterize the invention.

For a more detailed mechanistic understanding of the operation and ion transport mechanism of a typical system embodying principles of the invention, attention is invited to FIG. 2 which shows a portion of the feed inlet compartment 23, the catholyte compartment 25, the anolyte compartment 16, the cathode 27 and the anode 14. The mixed resin bed 22 that is confined between the anion membrane 21 and the cation membrane 24 is made of a group of generally spherical cation resin beads 93 and similarly shaped anion resin beads 94. Within the anolyte compartment, moreover, and in accordance with a characteristic of the invention, the anion resin bed 20, which is comprised of a mass of anion resin beads 95, is sandwiched between the anion membrane 21 and the cation membrane 17.

The catholyte compartment 25 also includes an array of cation resin beads 96 that form the cation resin bed 26 for this compartment. As previously mentioned, the cation resin bed 26 is enclosed between the cation membrane 24 and the anion membrane 30 that separates the catholyte compartment 25 from the negatively charged cathode 27.

In operation, with respect to a specific illustration of the invention under consideration, feed fluid containing ionized boric acid, $H_3BO_3$, and ionized lithium$^{-7}$ hydroxide, $Li^7OH$, flows into the feed inlet compartment in the direction of arrow 97. In this ionized state the feed fluid contains positively charged hydrogen ($H^+$) and lithium ($Li^+$) cations and negatively charged borate ($BO^-$, $BO_3^-$ and $B_3O_3^-$) and hydroxide ($OH^-$) anions.

It appears that the borate ions are removed from solution by displacing the hydroxide ions on the anion beads 94. In a similar manner the ionized lithium displaces $H^+$ ions on the cation beads 93. At junction 100, between cation resin beads 93 and the anion membrane 21, and junction 103 between anion resin beads 94 and the cation membrane 24, respectively, water molecules are dissociated producing $OH^-$ and $H^+$ ions. In these circumstances, the $OH^-$ ions migrate toward the positively charged anode 14. The $H^+$ ions, in turn migrate toward the negatively charged cathode 27.

During this migration these ions displace their counterpart lithium and borate ions from the resin beads 93, 94, as appropriate, thus electrolytically regenerating the respective resins. The displaced lithium cation will carry part of the electrical current through the resin bead chain and through the cation membrane 24 in order to concentrate in the catholyte compartment 25. Hydroxide ions, generated in the cathodic reaction between water and the cathode 27, moreover, migrate through the anion membrane 30 from a flushing fluid that immerses the cathode 27. These hydroxide ions concentrate in the catholyte compartment 25 which, it will be recalled, contained the cation resin bed 26. Hydrogen ions also migrate through the cation membrane 24 and collect in the catholyte compartment 25, thereby, recombining with hydroxide ions forming water. The common result of the cathodic reaction at the cathode 27 is the evolution of hydrogen gas and formation of the hydroxide ion. The common result of the lithium migration through cation membrane 24 and the hydroxide ion migration through the cation membrane 24 is the formation of lithium hydroxide. The cation resin bed 26 will initially saturate with the lithium ions and reach a solution/resin equilibrium. Any additional contaminative cations which migrate through cation membrane 24 will absorb on cation resin bed 26 thereby providing a cation purified solution of lithium hydroxide in catholyte compartment 25. It will be remembered that lithium$^{-7}$ is one of the products of the neutron-boron reaction in the reactor core and that this particular isotope of lithium in concentrated form is in scarce supply. According to the practice of the invention, the lithium$^{-7}$ isotope added to the initial charge of water for the reactor core coolant is conserved and the additional lithium$^{-7}$ produced through the neutron-boron reaction also is accumulated. In these circumstances the practice of the invention offers the long-term possibility not only of establishing lithium$^{-7}$ self-sufficiency but, perhaps, producing some lithium$^{-7}$ surplus.

In a somewhat similar manner, the borate and hydroxide anions migrate through the anion resin beads 94 and through the anion membrane 21. At junction 103 between the anion resin beads 94 and the cation membrane 24, respectively, the water molecules also are dissociated to produce OH$^-$ and H$^+$ ions. In these circumstances, the hydroxide ion migrates through the anion resin beads 94 displacing the borate ions. The displaced borate ion will carry part of the electric current through the resin bead chain and through the anion membrane 21 whereby the borate ions will concentrate in the anion compartment. Hydrogen ions generated in the anodic reaction between water and the anode 14 simultaneously migrate through the cation membrane 17 into the anolyte compartment 16 forming a concentrated stream of boric acid (H$_3$BO$_3$). The anodic reaction between water and the anode 14 (electrolysis) will also produce oxygen gas which is purged by a continuous flushing operation.

The common result of borate migration through the anion membrane 21 and the H$^+$ ion migration through the cation membrane 17 is the formation of boric acid in the anolyte compartment 16 which, it will be recalled, contained the anion resin bed 20. The anion resin will initially saturate with the borate ions and reach a solution/resin equilibrium. Any additional contaminative anions which migrate through the anion membrane 21 will be absorbed by the anion resin bed 20 thereby providing an anion purified solution of boric acid in the anolyte compartment 16.

When the anion and cation contaminates reach a saturation level on their respective anion resin bed 20 and cation resin bed 26, there ions will collect in the solution streams in both the anolyte compartment 16 and catholyte compartment 25. When this is detected by analytical methods the polarity of the cell unit is reversed converting the electrode 14 into a cathode and electrode 27 into an anode. This reversed polarity process will regenerate the anion resin beads 95 and simultaneously the eluted contaminative anions carry part of the electrical current from the anolyte compartment 16 through the anion membrane 21 into the feed compartment 23 whereby these contaminative anions will be purged from the system with feed solution flow.

Likewise during the reversed polarity operation, the cation resin beads 96 located in the catholyte compartment 25 will be regenerated and the eluted contaminative cations will carry part of the electrical current from the catholyte compartment 25 through the cation membrane 24 into the feed compartment 23 whereby the contaminative cations will be purged from the system with feed solution flow as shown in the direction of arrow 97.

During normal operation, that is not in a reversed polarity mode, the effluent that flows out of the feed inlet compartment 23 is essentially deionized water.

Consequently, in accordance with the specific embodiment of the invention under consideration, a typical cell flow path will provide a continuous process for producing final products that consist of separate and purified streams of concentrated boric acid, deionized water and concentrated lithium hydroxide from the respective compartments 16, 23, and 25.

Naturally, as mentioned above, the anodes and cathodes will be flushed on a continuous basis to remove impurities and the gases generated from the electrode reactions also will be purged continuously. Typically 3% to 5% by weight of boric acid will be maintained in the fluid flowing from the anolyte compartments and 1000 parts per million (ppm) to 5000 ppm of lithium$^{-7}$ hydroxide will be maintained in the stream from the catholyte compartments.

It will be recalled that tritium is produced from fission process as well as neutron reactions with soluble chemicals within the reactor core and that this particular hydrogen isotope creates some health and environmental problems.

A preferential exchange of "tritiated water" (that is, water molecules in which the tritium isotope of the element hydrogen is in chemical combination with oxygen) has been observed with certain types of minerals. This curious phenomena has been especially noted in connection with clays. The actual mechanism for this is not entirely clear but one theory seems to indicate that in kaolinite clays, for example, the tritium displaces aluminum from the fixed lattice sites, whereby, the aluminum atoms in the clay structure then move from fixed into exchange position sites. Enhancement of the preferential tritium separation process can be induced by ionization and the ion transport process.

Electrodialysis, moreover, is a process that can be used to enhance ion exchange rates. The cell structure described above in connection with FIGS. 1 and 2 establishes an electrodialysis environment. In these circumstances, substituting beads of kaolinite clay, or some other suitable material that preferentially absorbs tritium, for the mixed resin bed 22 that is shown in FIG. 2 can produce an improved system for continuously extracting tritium from the reactor core coolant in a form that simplifies the tritium disposal problem or makes the tritium more readily available for extraction and further use.

Naturally, depending on the degree of purification sought, more cells can be added to the array that is shown in FIG. 1. Depending on specific applications intended, moreover one or more of the anion and cation resin beds that characterize the foregoing specific example can be eliminated from the cell structure or interchanged, depending on the circumstances.

The embodiments of the invention in which an exclusive property or privilege is claimed are defined as follows:

1. A cell structure for separating an ionized solution into streams of concentrated acid, concentrated alkali and deionized fluid comprising a bed of mixed anion and cation resin, an anion membrane forming a partition for a side of said mixed resin bed, a cation membrane forming a partition for another side of said mixed resin bed, an anion resin bed adjacent to said anion membrane, a cation membrane forming a partition for a different side of said anion resin bed, an anode spaced from said anion resin bed and said cation membrane, a cation resin bed adjacent to said cation membrane that forms a partition for another side of said mixed resin bed, an anion membrane forming a partition for a different side of said cation resin bed, and a cathode spaced from said cation resin bed and said anion membrane that partitions said cation resin bed.

2. A cell structure according to claim 1 further comprising a feed fluid inlet conduit for establishing fluid communication with said mixed anion and cation resin bed and a feed fluid discharge conduit for establishing fluid communication from said mixed anion and cation resin bed for the deionized fluid.

3. A cell structure according to claim 1 further comprising an anolyte inlet conduit for establishing fluid communication with said anion resin bed and an anolyte discharge conduit for establishing fluid communication from said anion resin bed for the concentrated acid.

4. A cell structure according to claim 1 further comprising a catholyte inlet conduit for establishing fluid communication with said cation resin bed and a catholyte discharge conduit for establishing fluid communication from said cation resin bed for the concentrated alkali.

5. A cell structure for separating a solution containing anions and cations into streams of concentrated acid, concentrated alkali and deionized fluid comprising a feed inlet compartment for treating the ionized solution, a mixed resin within said feed inlet compartment, an anionic fluid containing compartment for producing the stream of concentrated acid, a cationic fluid containing compartment for producing the stream of concentrated alkali, an anion membrane interposed between said anionic fluid containing compartment and said feed inlet compartment to permit the migration of the anions there through toward said anionic fluid containing compartment and to prevent the migration of the cations, a cation membrane interposed between said feed inlet compartment and said cationic fluid containing compartment to permit the migration of the cations therethrough toward said cationic fluid containing compartment and to prevent the migration of the anions, an anode spaced from said anionic fluid containing compartment, a further cation membrane interposed between said anode and said anionic fluid containing compartment to permit the migration of cations therethrough toward said anionic fluid containing compartment, a cathode spaced from said cationic fluid containing compartment, and a further anion membrane interposed between said cathode and said cationic fluid containing compartment to permit the migration of anions therethrough toward said cationic fluid containing compartment, whereby said anions and cations migrating said anionic fluid containing compartment produce the concentrated acid and said anions and cations migrating into said cationic fluid containing compartment produce the concentrated alkali.

6. A cell structure for removing tritium from water comprising a feed inlet compartment, an anion membrane forming a side of said compartment, a cation membrane forming another side of said compartment, and material within said compartment for preferentially removing the tritium from the water.

7. A cell structure according to claim 6 wherein said material further comprises a clay.

8. A cell structure according to claim 6 wherein said material further comprises a kaolinite clay.

9. A cell structure according to claim 7 wherein said clay further comprises a crystalline structure that contains aluminum.

* * * * *